Figure 1:
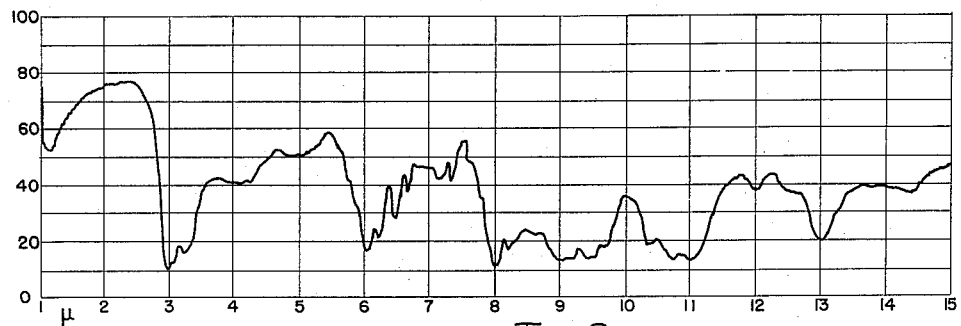

July 4, 1961 A. WENZ ET AL 2,991,284
NOVEL DERIVATIVES OF COCARBOXYLASE
Filed Sept. 25, 1958 2 Sheets-Sheet 1

INVENTORS
ADOLF WENZ
GEORG GÖTTMAN
BY HERMANN KOOP

ATTORNEYS

United States Patent Office 2,991,284
Patented July 4, 1961

2,991,284
NOVEL DERIVATIVES OF COCARBOXYLASE
Adolf Wenz, Georg Göttmann, and Hermann Koop, Darmstadt, Germany, assignors to E. Merck, Aktiengesellschaft, Darmstadt, Germany, a corporation of Germany
Filed Sept. 25, 1958, Ser. No. 763,218
Claims priority, application Germany Sept. 28, 1957
7 Claims. (Cl. 260—256.6)

This invention relates to cocarboxylase; and in particular is directed to a novel tetrahydrate and novel salts of cocarboxylase.

K. Lohmann and Ph. Schuster isolated in 1937 the coenzyme of the carboxylase from yeast in the form of the aneurin-pyrophosphoric acid-ester-chloride. According to Karrer (see Lehrbuch der organischen Chemie, by P. Karrer, Georg Thieme Verlag, Stuttgart, 1948, p. 770), the term cocarboxylase defines the inner salt of the aneurin-pyrophosphoric acid-ester (I).

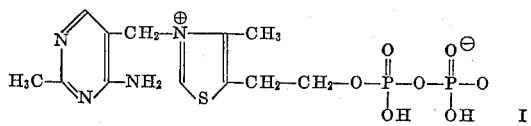

However, in the meantime it has become customary to designate as cocarboxylase the aneurin-pyrophosphoric acid-esterchloride (II).

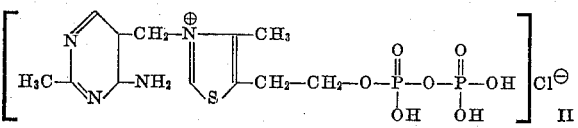

even though this compound would have been better defined as cocarboxylasehydrochloride. Hereinafter, the term "cocarboxylase" refers to the inner salt of the aneurin-pyrophosphoric acid ester (I).

Numerous methods are known for the manufacture of the cocarboxylase hydrochloride.

Stern and Hofer [see Science, vol. 85, p. 483 (1937)] synthesized the compound by reacting aneurin with POCl$_3$. J. Weijlard and H. Tauber [see Journal of the American Chemical Society, vol. 60, p. 2263 (1938)] reacted aneurin with a mixture of sodium pyrophosphate and orthophosphoric acid, whereas H. Weil-Malherbe [see Biochemical Journal, vol. 34, p. 980 (1950)] treated the 5-bromoethyl-thiazole analogue of the aneurin with silver phosphate. In both cases cocarboxylase was isolated as a silver salt. Weijlard and Tauber decomposed this salt with H$_2$S and isolated cocarboxylase-hydrochloride by treatment with hydrochloric acid. Weil-Malherbe effected the purification with phosphotungstic acid. In 1946 Karrer and Viscontini [see Helvetica Chimica Acta, vol. 29, p. 715 (1946)] improved the method of Weijlard and Tauber.

In addition to the afore listed publications, there are a number of German patents (663,588, 704,172, 706,835, 708,514 and 729,905) and patents in other countries (see U.S. patents 2,188,323, 2,224,174, 2,415,544, 2,435,750; British patents 687,674 and 687,673; French patent 930,643) which all relate to the manufacture or purification of cocarboxylase-hydrochloride and disclose generally methods which permit a direct phosphorylation of the aneurin. All the methods as heretofore known, including the phosphorylation with polyphosphoric acid, have the disadvantage that the obtainable yields are low. Furthermore, in many instances the methods cannot be perfectly reproduced.

The principal object of the present invention is to provide a simple, economical, technically practical method of producing cocarboxylase salts in good yields.

The invention is based upon the recognition of the fact that the principal difficulty encountered in the isolation of the cocarboxylase or its salts from the mixtures which are formed during the phosphorylation of aneurin, resides in the separation of the always present aneurin-orthophosphoric acid ester and that it is essential in this connection to avoid as much as possible the danger of hydrolysis of the cocarboxylase to aneurin-orthophosphoric acid ester by suitably selected conditions. It has further been found to be advantageous to separate, if possible, the excess orthophosphoric acid employed or formed during the phosphorylation before the splitting process of the aneurin-phosphoric acid-ester mixture, i.e., before separating the components thereof.

In order to separate the major quantity of orthophosphoric acid, the phosphorylation mixture can be precipitated from an aqueous solution by means of suitable organic solvents, and this process repeated several times, and/or one can conduct the mixture over a weak basic anionic exchanger, for instance of the type Amberlite IRA 410 or Amberlite IR 45. Except for small residues, the orthophosphoric acid is retained in the weakly basic anionic exchanger during this process, and by eluting with water, a separation of the effluent run-off of the phosphoric acid-ester mixture can be obtained. Within the range of pH 6.5 and 5.5 an aqueous solution of the aneurin-orthophosphoric acid-ester runs off. Within the pH range of 5.5–1, the eluate contains mostly cocarboxylase, which is increasingly mixed with phosphoric acid as the acidity (measured by the pH value) increases.

A better separation can be obtained when a solution running off from the weakly basic anionic exchanger is conducted through a strongly basic anionic exchanger, for instance, of the type Permutit ES or Amberlite IRA 400. By splitting the eluate in the above stated pH fractions, a better separation is attained than by using a weak basic exchanger. The process of separation can be further simplified, if after hydrolysis of the mixture containing aneurin-triphosphoric acid ester, the phosphoric acid is removed by means of a weak basic anionic exchanger, and the solution running off from this anionic exchanger is conducted over a cationic exchanger, such as Amberlite IRC 50, IR 100, IR 105 or IR 120, since such cationic exchangers retain the thiamine orthophosphoric acid ester and pass the free cocarboxylase.

It has now been found that one can obtain a crystallized cocarboxylasetetrahydrate from the eluate of a cationic exchanger and also from the eluate fractions of pH 5.5 to 1 from anionic exchangers by concentrating the aqueous solution. This substance, which has not been described heretofore, has a decomposition point of 220 to 225° C. (at about 140° expansion with release of water) and can be crystallized from an aqueous solution after the addition of lower alcohols or acetone or other suitable organic solvents. The pH value of a .5 percent aqueous solution of cocarboxylasetetrahydrate is 3.0 at 20° C. (measured on a glass electrode).

Since the cocarboxylasetetrahydrate reacts only weakly acidic in aqueous solution, a separation to aneurin-orthophosphoric acid-ester does not occur for all practical purposes. Hence, cocarboxylasetetrahydrate can be recrystallized as often as desired from an aqueous solution and the substance can be produced with the highest degree of purity without appreciable losses by hydrolysis. In a Warburg-Test the cocarboxylase-tetrahydrate shows the full cocarboxylase activity so that it is highly suitable for a direct therapeutic application, especially in view of its favorable pH value.

In addition the cocarboxylase-tetrahydrate, since it has hardly any tendency to hydrolysis, has a materially better stability than cocarboxylase-hydrochloride, which constitutes the present marketed product for cocarboxylase.

The corresponding salts of cocarboxylase can be obtained in good yields from the cocarboxylase-tetrahydrate in a simple manner by reaction with aqueous, alcoholic, acetonic or other solutions of acids in organic solvents. The formation of salt can be performed with inorganic and organic acids.

The yields of cocarboxylase salts, which are obtained by reaction of crystallized cocarboxylase-tetrahydrate with acids, are considerably better than the ones which are obtained in the manufacture of the salts by reacting acids with aqueous cocarboxylase solution. The salts of the cocarboxylase prepared by the method according to the invention are analytically pure and need not be recrystallized. The preparation is suitable effected by starting with a solution of an acid in an organic solvent, optionally in the presence of water, and then adding the cocarboxylase-tetrahydrate in crystalline form, and then waiting until the formed salts of the cocarboxylase has been deposited, which is usually the case after a few minutes, and subsequently separating the formed cocarboxylase salts by applying the usual methods, for instance, by suction or filtration.

In this manner were prepared, for instance, the following salts of the cocarboxylase, of which only was known heretofore the cocarboxylase-hydrochloride:

Cocarboxylase-hydrochloride, decomposition point 240° C.
Cocarboxylase-hydrobromide, decomposition point 246–248° C.
Cocarboxylase-hydroiodide, decomposition point 205–207° C.
Cocarboxylase-nitrate, decomposition point 208–210° C.
Cocarboxylase-sulfate, decomposition point 120° C.
Cocarboxylase-sulfanilate, decomposition point 228–230° C.
Cocarboxylase - naphthalene - $\beta$ - sulfonate, decomposition point 198–200° C.

The process can be reversed and the cocarboxylase-tetrahydrate can be produced by conducting the salts of the cocarboxylase over a suitable ionic exchanger, as for example, Amberlite IR 45, IRA 400, IRA 401, or IRA 410. In this manner the cocarboxylase-tetrahydrate was produced, for instance, from cocarboxylase-hydrochloride.

According to Teruo Tanaka [see Journal of the Pharmaceutical Society Japan, vol. 76, pages 1314–1318 (1956), referred to in Chemical Abstracts vol. 51, page 3607 (1957)], one obtains cocarboxylase-hydrochloride by dissolving the mixture obtained from the phosphorylation of vitamin $B_1$ with polyphosphoric acid after several precipitations from water with ethanol, bringing the dissolved mixture to pH 7 by means of $NH_4OH$ and conducting it over a column filled with a Dowex-1×8 exchanger. Hereupon the aneurin orthophosphoric acid ester, which is present as a by-product in the mixture, is eluated with water and subsequently there is obtained by eluation with 0.005 molar aqueous HCl an aqueous solution of cocarboxylase-hydrochloride, which is concentrated and by addition with ethanol is worked up into crystalline cocarboxylase-hydrochloride. This method produces, apart from its poor yield, only a cocarboxylase-hydrochloride having a decomposition point of 215–216° C. Consequently, such cocarboxylase - hydrochloride must contain a material percentage of impurities as, for example, orthophosphoric acid ester. In contradistinction thereto, the present method produces cocarboxylase-hydrochloride in substantially higher yield and of higher purity. (The decomposition point of cocarboxylase-hydrochloride obtained by the present method is at 240° C.) By recrystallizing from an aqueous-alcoholic solution, the cocarboxylase-hydrochloride can be somewhat purified but such purification entails substantial losses of yield because the cocarboxylase-hydrochloride is transformed to a substantial percentage by hydrolysis into the orthophosphate or the chloride of the aneurin-orthophosphoric acid ester. The methods of preparing or purifying the cocarboxylase-hydrochloride as described in Belgium Patents 548,447 and 550,722 have similar disadvantages. According to the method of Belgium Patent 548,474, the phosphorylation mixture obtained from the phosphorylation of vitamin $B_1$ is split by means of an anionic exchanger, and the eluate fraction containing the cocarboxylase is subsequently reacted with acids to the corresponding salts (reference is made merely to the cocarboxylase-hydrochloride). As is evident, the yield thus obtained is very low because it cannot be avoided that cocarboxylase-hydrochloride is strongly hydrolytically decomposed in the aqueous medium. There are formed, for instance, the orthophosphate or the chloride of the aneurin-orthophosphoric acid ester. Hence this method is economically without interest. The method of purification described in Belgium Patent 550,772 also does not avoid the aforedescribed disadvantage. According to the method of the second Belgium patent, the cocarboxylase-hydrochloride is also obtained by precipitation with aqueous hydrochloric acid, from aqueous cocarboxylase solution. The disadvantages of such method are the same as described before.

In contradistinction thereto, the present method affords a substantial technical advance because the process of purifying the respective salts of the cocarboxylase is shifted to the cocarboxylase-tetrahydrate whereby recrystallizations of the salts obtained from the cocarboxylase-tetrahydrate become superfluous. Furthermore, the new cocarboxylase-tetrahydrate is in itself a therapeutically valuable form of application of the cocarboxylase and constitutes simultaneously the key substance for many physiological salts of the cocarboxylase which can be prepared from it.

The following are examples in accordance with this invention:

*Example 1.*—2 kg. of vitamin $B_1$ (thiamine chloride hydrochloride) are phosphorylated in the usual manner; as follows: 4.5 kg. of aqueous 89% orthophosphoric acid are heated to 135° C., and kept at this temperature for about three hours while being actively stirred. Then, the heating is discontinued and 3.5 kg. of phosphoruspentoxide are added during a period of 2½ to 3 hours, while being actively stirred. During this period, the interior temperature rises to 165–175° C.

After completion of the addition of phosphoruspentoxide, the stirring is continued until all the phosphoruspentoxide is dissolved. The phosphoric acid mixture thus produced is subsequently cooled down to 130° C.

At this temperature 2.0 kg. of thiamine chloride hydrochloride were added during two to three hours while being well stirred. The stirring is continued at 130° C. until the phosphorylated mixture no longer contains chlorine ions. (The content of chlorine ions is determined in a sample of the substance by the addition of silver nitrate.) A phosphorylated melt is thus obtained.

The thus-obtained phosphorylation melt is dissolved in 6–8 liters of water (+ ice) at a temperature below 10° C., while being vigorously stirred, i.e., the temperature of the solution is kept between 0° and 10° C. by the addition of ice. The aqueous solution is stirred into 100 liters of 96% alcohol and left standing overnight. The supernatent solvent is decanted from the separated syrup; the latter is taken up in 4 liters of water. The solution thus obtained is fed, depending upon the volume of phosphoric acid contained therein, to an exchanger column filled with anion exchanger (weak basic, for instance Amberlite IRA 45) (a polystyrene resin with primary, secondary and quaternary amino groups). The column contains 20–30 liters of anion exchanger resin of the above described kind. The solution is caused to seep into the column from the top thereof (the technique is the same as that used in absorption chromatography) and is then washed with water until the run-off at the bottom no longer shows any thiamine reaction. The thiamine reaction is as follows: A sample of the run-off solution is mixed with caustic soda, yellowing signifies that the solution contains thiamine; if there is no yellowing, the solution is free of thiamine. About 25 liters of the solution are obtained, which are concentrated to 6 liters at 30° C. and 12 Torr. The concentrated residue is added to 20 to 30 liters of a cationic exchanger (Amberite IRC 50) in order to separate the thiamine-orthophosphoric acid ester from the thiamine-pyrophosphoric acid ester, and subsequently washed with water until the eluate is free of thiamine. 70–80 liters of a solution are obtained which are concentrated to 1.5 liters in a circulation evaporator at 30° C. and 12 Torr. 7.5 liters of 96% alcohol (ethanol) are slowly added to the concentrate while being stirred. The cocarboxylase-tetrahydrate separates in the form of fine needles. The yield is 530 g. with a melting point of 220–225° with decomposition (sintering while releasing water at 140° C.). The thiamine-orthophosphoric acid ester which adheres to the cationic exchanger is loosened by washing with 10% hydrochloric acid, the aqueous hydrochloric acid solution (about 50–60 liters) is condensed to 3 liters at 40–45° and 12 Torr, and the residue is precipitated with 5 times the volume of alcohol. 1.3 kg. of thiamine-orthophosphoric acid-ester-chloride-hydrochloride separate, hence 2 kg. of vitamin B$_1$ produce:

530 g. of cocarboxylase-tetrahydrate and
1.3 kg. thiamine-orthophosphoric acid-ester-hydrochloride.

The cocarboxylase-tetrahydrate has the infra red spectrum (measured in KBr) shown in FIG. 1.

*Example 2.*—2 kg. of vitamin B$_1$ (thiamine chloride hydrochloride) are phosphorylated as in Example 1, dissolved and the obtained phosphoric acid ester mixture is freed from the major portion of phosphoric acid by precipitation with alcohol. The syrup is taken up in 5 liters of water, the entire solution is conducted once over 25 liters of a strong basic exchanger (Permutit ES) and washed subsequently with water. 3 fractions are separated. At a pH 6.6–6.0 thiamine-orthophosphoric acid-ester runs off in the eluate. The second fraction is at a pH of 6.0 to 5.4 giving a run-off of co-carboxylase-tetrahydrate containing as an impurity about 25–30% of thiamine-orthophosphoric acid-ester. Finally a fraction at a pH of 5.4 to 2, is obtained which is practically pure cocarboxylase tetrahydrate. The first fraction is concentrated at about 12 Torr and 35° C. and the thiamine-orthophosphoric acid-ester is caused to crystallize by precipitation from the concentrate with alcohol (ethanol). In the same manner 746 g. of an ester mixture is crystallized from the second fraction. This mixture is recrystallized by dissolving it in 1.5 liters of water and adding 3.5 liters of alcohol. 412 g. of pure cocarboxylase-tetrahydrate are obtained. The thiamine-orthophosphoric acid ester is contained in the mother liquor and is isolated in a known manner. By concentrating the third fraction and precipitation with alcohol (ethanol), another 81 g. of cocarboxylase-tetrahydrate are produced. The following yield is obtained:

493 g. cocarboxylase-tetrahydrate and
1.0 kg. thiamine-orthophosphoric acid-ester.

*Example 3.*—A mixture of 20 g. thiamine-orthophosphoric acid ester-phosphate, 20 g. of cocarboxylase-tetrahydrate and 20 g. orthophosphoric acid are dissolved in 100 cc. of water, guided through 300 cc. of a weak basic exchanger Merck II and washed with water. In the main fraction of pH 6.7 to 6.3, a solution is obtained which contains a mixture of thiamine-ortho and -pyrophosphoric acid-ester (30 g.), which is further worked up in accordance with Example 2. In the pH-range of 6.3 to 4.9, an eluate runs off which contains pure cocarboxylase-tetrahydrate and is isolated, as described in Example 2 (3 g.).

*Example 4.*—A mixture according to Example 3 is freed from the phosphoric acid by means of a weak basic ionic exchanger (Amberlite IRA 410 or Merck II), then washed with water and the eluate which contains the thiamine-orthophosphoric acid-ester and also cocarboxylase, is concentrated by evaporation. Subsequently, the concentrate of about 200 cc. is conducted over 250 cc. of a strongly basic exchanger (Permutit ES) in which the separation according to Example 2 is effected.

*Example 5.*—298 g. of cocarboxylase-hydrochloride are dissolved in 2 liters of water, the solution conducted over 2.5 liters of an anionic exchanger laden with orthophosphoric acid (Permutit ES) and set for pH 4.5. It is then washed with water until the run-off is free of thiamine. The eluate is concentrated at 30° C. and 12 Torr and precipitated with 2.5 times the volume of acetone.

The yield is:

292 g. of cocarboxylase-tetrahydrate.

*Example 6.*—10 g. of cocarboxylase-tetrahydrate are dissolved in 25 cc. of 5% aqueous hydrochloric acid, and 75 cc. acetone are added drop-wise while being stirred. The precipitated hydrochloride of the cocarboxylase is sucked off. The yield is 9.5 g. The substance melts at 240° C. while decomposing.

Instead of aqueous hydrochloric acid, methanolic hydrochloric acid can be used more advantageously. In such case the tetrahydrate first dissolves and precipitates after a few minutes as chloride with the same yield and in the same quality as is obtained from the aqueous solution.

Figure 2:
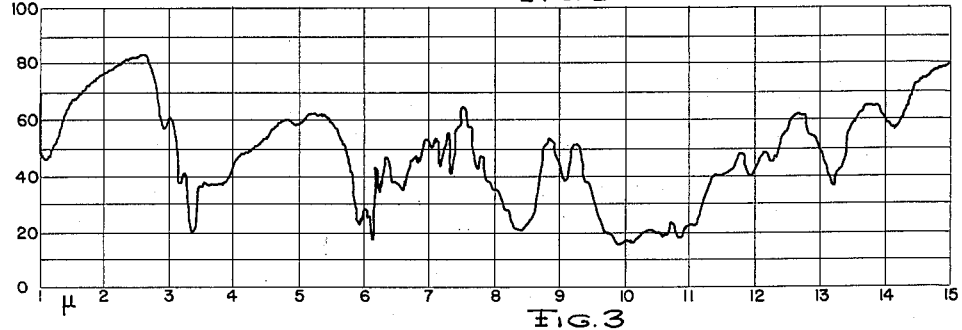

Cocarboxylase-hydrochloride has the infra red spectrum (measured in KBr) shown in FIG. 2.

*Example 7.*—10 g. of cocarboxylase-tetrahydrate are dissolved in a mixture of 7 cc. of 48% hydrobromic acid and 18 cc. of water and precipitated with acetone as in Example 6. The yield is 9.8 g. of cocarboxylase-hydrobromide having a melting point of 246–248° C. (with decomposition).

Figure 3:
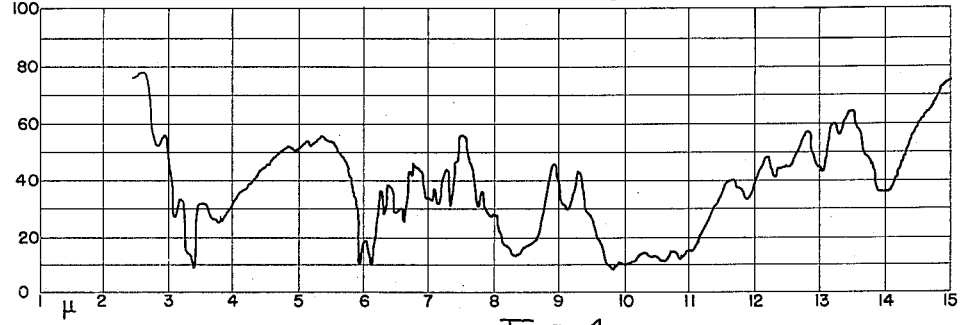

Cocarboxylase-hydrobromide has the infra red spectrum (measured in KBr) shown in FIG. 3.

*Example 8.*—10 g. of cocarboxylase-tetrahydrate are dissolved in 10 cc. of 57% hydriodic acid (HI) and 15 cc. of water; and precipitated as in Example 6. The yield is 10.5 g. of cocarboxylase-hydro-iodide having a melting point of 205–207° C. while being decomposed. This substance contains 1 mole of water of crystallization.

Figure 4:
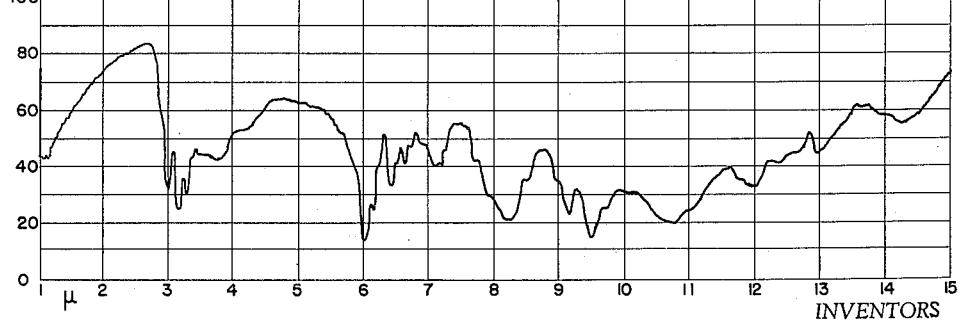

Cocarboxylase-hydro-iodide has the infra red spectrum (measured in KBr) shown in FIG. 4.

*Example 9.*—10 g. of cocarboxylase-tetrahydrate are dissolved in 10 cc. of 25% nitric acid and 15 cc. of water. The working up is in accordance with Example 6. The yield is 9.5 g. of cocarboxylase-nitrate having a melting point of 208–210° C. (with decomposition). The nitrate contains 1 mole of water of crystallization.

Figure 5:
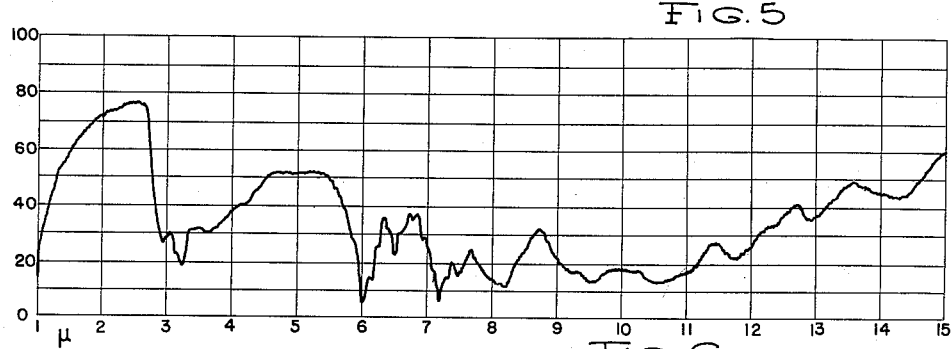

Cocarboxylase-nitrate has the infra red spectrum (measured in KBr) shown in FIG. 5.

*Example 10.*—10 g. cocarboxylase-tetrahydrate are dissolved in 30 cc. of 10% sulfuric acid and the solution is mixed with acetone as in Example 6. 10.0 g. of cocarboxylase sulfate having a melting point of 120° C. (with decomposition) are isolated. The sulfate contains 1 mole of water of crystallization.

Figure 6:
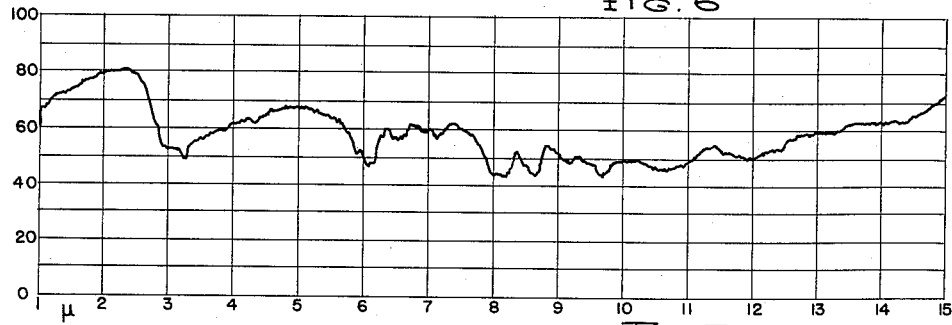

Cocarboxylase sulfate has the infra red spectrum (measured in KBr) shown in FIG. 6.

*Example 11.*—5 g. of cocarboxylase-tetrahydrate are dissolved in a solution of 2.2 g. of sulfanilic acid in 80 cc. of water at a temperature of 60–70 ° C., cooled to room temperature and precipitated with acetone as in Example 6. The yield is 6 g. of cocarboxylase sulfanilate having a melting point of 228–230° C. (with decomposition).

Figure 7:
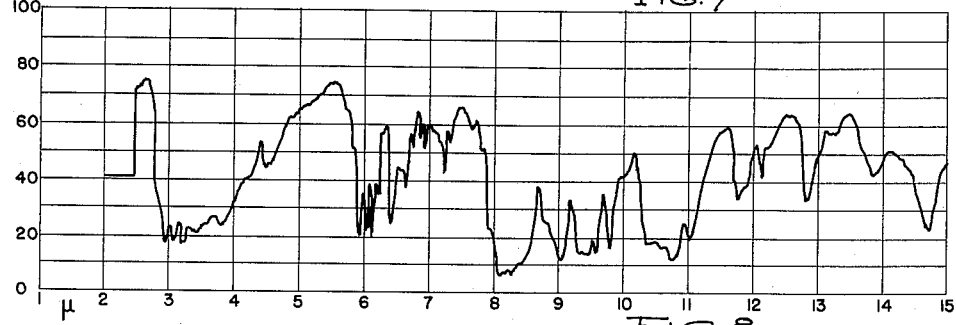

Cocarboxylase-sulfanilate has the infra red spectrum (measured in KBr) shown in FIG. 7.

*Example 12.*—5 g. of cocarboxylase-tetrahydrate are dissolved in 2.5 g. β-naphthalene-sulfonic acid in 30 cc. of water and worked up according to Example 6. The yield is 6.4 g. of cocarboxylase-naphthalene-β-sulfonate having a melting point of 198–200° C. (with decomposition). This β-sulfonate contains 1 mole of water of crystallization.

Figure 8:
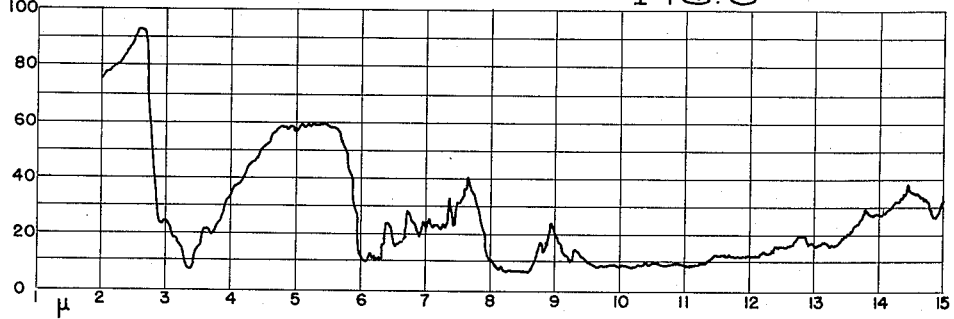

Cocarboxylase-naphthalene-β-sulfonate has the infra red spectrum (measured in KBr) shown in FIG. 8.

The term "Torr" designates the international unit of pressure. It is defined in "A German-English Dictionary for Chemists" by Austin M. Patterson, John Wiley & Sons, Inc., New York, Third Edition, as follows:

"Tor, tor. pressure of 1 mm. mercury, 1/760 atmosphere."

The various ion exchange substances mentioned above are well known and used in many arts. They are described, inter alia, in "Deutsche Apotheker-Zeitung," issue of May 17, 1956, No. 20, at pages 435, 436.

It will be understood that the foregoing description of the invention and the examples set forth are merely illustrative of the principles thereof. Accordingly, the appended claims are to be construed as defining the invention within the full spirit and scope thereof.

We claim:
1. Cocarboxylase-tetrahydrate of the block formula $C_{12}H_{18}N_4O_7P_2S \cdot 4H_2O$ and the structural formula:

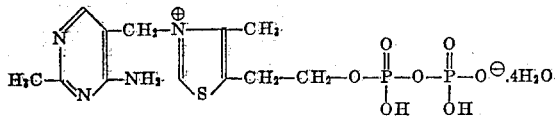

having a decomposition point of 220–225° C.

2. Method of manufacturing a stable derivative of cocarboxylase comprising the steps of dissolving in water the mixture obtained on the phosphorylation of aneurin, conducting the aqueous solution over an anionic exchanger, separating the eluate running off at a pH of 5.5 to 1, adding to said eluate a member of the group consisting of lower alkyl alcohols and acetone thereby to precipitate cocarboxylase-tetrahydrate, and isolating the cocarboxylase-tetrahydrate.

3. Method of manufacturing a stable derivative of cocarboxylase comprising the steps of dissolving in water a mixture obtained on the phosphorylation of aneurin, adding to said solution a member of the group consisting of lower alcohols and acetone thereby to obtain a precipitated syrup, dissolving said precipitated syrup in water, conducting said solution over an anionic exchanger, separating the eluate running off at a pH of 5.5 to 1, adding to said eluate a member of the group consisting of lower alcohols and acetone thereby to precipitate cocarboxylase-tetrahydrate, and isolating the cocarboxylase-tetrahydrate.

4. Method in accordance with claim 2 wherein the eluate running off at a pH of 5.5 to 1 is conducted over a cationic exchanger, the run-off eluate therefrom is separated, and obtaining therefrom cocarboxylase-tetrahydrate in crystalline form by precipitation with a member of the group consisting of lower alcohols and acetone.

5. Method of manufacturing a stable derivative of cocarboxylase which comprises the steps of conducting an aqueous solution of salts of cocarboxylase including impurities in the form of free acid over an anionic exchanger, separating the eluate running off at pH 5.5 to 1, and obtaining therefrom cocarboxylase-tetrahydrate in crystalline form by precipitation with a member of the group consisting of lower alcohols and acetone.

6. Method in accordance with claim 2 wherein the cocarboxylase-tetrahydrate is isolated by removal of water from the solution of cocarboxylase-tetrahydrate in water.

7. Method in accordance with claim 2 including the further step of adding an acid of the cocarboxylase-tetrahydrate thereby to convert it into the said acid salt of cocarboxylase.

References Cited in the file of this patent
UNITED STATES PATENTS 2,863,870   Ciriello _____ Dec. 9, 1958

FOREIGN PATENTS 793,753   Great Britain _____ Apr. 23, 1958

OTHER REFERENCES

Weijlard: Jour. Amer. Chem. Soc., volume 64, pages 2279–2280 (1942).

Siliprandi et al.: Biochimica et Biophysica Acta, vol. 14, pages 55–56 (1954).